(12) United States Patent
Rehtijärvi

(10) Patent No.: US 8,756,271 B2
(45) Date of Patent: Jun. 17, 2014

(54) PROVIDING A CUSTOMIZED APPLICATION TO A USER TERMINAL

(76) Inventor: Pekka Aarne Rehtijärvi, Helsinki (FI)

( * ) Notice: Subject to any disclaimer, the term of this patent is extended or adjusted under 35 U.S.C. 154(b) by 0 days.

(21) Appl. No.: 12/817,527

(22) Filed: Jun. 17, 2010

(65) Prior Publication Data

US 2010/0325202 A1  Dec. 23, 2010

(30) Foreign Application Priority Data

Jun. 18, 2009  (FI) ...................................... 20095696

(51) Int. Cl.
*G06F 15/16* (2006.01)
*H04L 29/08* (2006.01)
*G06F 9/445* (2006.01)

(52) U.S. Cl.
CPC ..................................... *H04L 67/34* (2013.01); *G06F 9/445* (2013.01)
USPC ......................................... 709/203; 709/201

(58) Field of Classification Search
CPC ................................ H04L 67/34; G06F 9/445
USPC .................................................. 709/203, 201
See application file for complete search history.

(56) References Cited

U.S. PATENT DOCUMENTS

| | | | |
|---|---|---|---|
| 6,314,428 B1 * | 11/2001 | Brew et al. ............................. | 1/1 |
| 2002/0184308 A1 * | 12/2002 | Levy et al. .................... | 709/203 |
| 2005/0220076 A1 * | 10/2005 | Kokado ........................ | 370/351 |
| 2006/0111967 A1 | 5/2006 | Forbes | |
| 2007/0061486 A1 | 3/2007 | Trinh et al. | |
| 2007/0244926 A1 | 10/2007 | Vitanov et al. | |
| 2007/0250711 A1 * | 10/2007 | Storey .......................... | 713/168 |
| 2008/0195997 A1 * | 8/2008 | Herberger et al. ............ | 717/100 |
| 2009/0008445 A1 | 1/2009 | Chen et al. | |
| 2009/0012900 A1 | 1/2009 | Morin et al. | |

FOREIGN PATENT DOCUMENTS

| | | |
|---|---|---|
| EP | 1 315 088 A2 | 5/2003 |
| WO | WO 2004/045148 A1 | 5/2004 |
| WO | WO 2008/084397 A1 | 7/2008 |

* cited by examiner

*Primary Examiner* — Dustin Nguyen
*Assistant Examiner* — Joel Mesa
(74) *Attorney, Agent, or Firm* — Ziegler IP Law Group, LLC

(57) ABSTRACT

A method for providing a user terminal with an application, which is customized in respect of user-specific parameters and terminal-specific properties. An application server stores a template for the customized application and a feature set for each of several terminal types; receives a request (2-2) for creation of the customized application, and determines the user-specific parameters based on the request; sends the user terminal a data message (2-10) which triggers a request (2-14) from the user terminal; determines the user terminal's type based on the request (2-14); determines the terminal-specific properties based on the determined type; creates the customized application based on the template, the user-specific parameters and the terminal-specific properties; inserts the customized application into a set of delivery files for a data communication system and transmits (2-26) the set of delivery files to the user terminal.

21 Claims, 4 Drawing Sheets

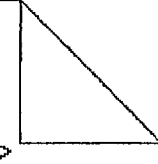

Fig. 5

```
501  →    <card>
502  →       <background tile='tile.png' style='fill'/>
503  →       <image id='logo' src='/image.png' align='center' y='1'/>
504  →       <string id='name' text='Test User' align='center' y='10'/>
505  →       <string id='id' text='123456' align='center' y='20'/>
510  →       <menu height='10' width='20'>
511  →          <item id='weblaunch' text='Web access' url='anyurl?flash=no'/>
512  →          <item id='web2' text='Where am I' url='anyurl?lapi=LongLat' />
                <item id='weblaunch3' text='Dynamic web' url='anyurl?ajax=yes' />
                <item id='exit' text='Exit' value='quit'/>
517  →          <itemid='send-to-friend' text='Send to Friend' value='send.zml'/>
518  →          <item id='subpage' text='Show barcode' value='/barcode.zapml'/>
519  →       </menu>
520  →       <nfc-id tag='123456'/>
             <flash ='no'/>
522  →       <javascript='yes' enable='yes'/>
523  →       <location-api='yes' enable='yes' />
             <send-to-friend='yes' />
             <card-expire='12092009 133058'/>
             <3gpp-play='yes'/>
             <j2me-video='yes' audio='yes' http='yes' socket='yes'/>
             <capability name="loctapi" value="true"/>
             <capability name="3dapi" value="true"/>
530  →       <capability name="Bluetooth" value="true"/>
531  →       <capability name="lock_imei" value="true"/>
539  →    </card>
```

PROVIDING A CUSTOMIZED APPLICATION TO A USER TERMINAL

PARENT CASE INFORMATION

The present application claims priority from commonly owned Finnish patent application 20095696, filed 18 Jun. 2009.

FIELD OF THE INVENTION

The invention relates to methods, apparatuses and software products for providing customized applications that are to be downloaded to user terminal, such as mobile communication terminals.

An electronic customer loyalty card with embedded functionality serves as an illustrative but non-restrictive example of a customized downloadable application.

A smart mobile phone constitutes a prime example of such terminals, but the ability to initiate or receive calls is not absolutely necessary for the invention. In addition to smart mobile phones, an illustrative but non-exhaustive list of terminals that may be adapted to employ the inventive technique includes digital communication terminals, digital cameras, satellite navigation devices, or the like.

BACKGROUND OF THE INVENTION

Customer loyalty cards are traditionally embodied as plastic cards with magnetic stripes that are readable by a magnetic card reader operatively coupled to a checkout terminal, such as a cash register. Such plastic loyalty cards involve certain problems. For example, administration and mailing of the cards is a labour-intensive operation for the issuing companies. Furthermore, the necessity of carrying around a number of physical cards is a burden on the consumers. US patent application 2009/0012900, titled "Making Secure Data for Customer Loyalty Programs" addresses various techniques for implementing electronic loyalty cards.

Replacement of the traditional loyalty cards by their electronic equivalents poses new security threats, particularly if the benefits provided by the various loyalty card are supposed to be variable, which means that some loyalty cards provide benefits not provided by others. Obviously, the loyalty cards should be tamper-proof, which goals typically reached by means of cryptographic techniques. But the use of cryptographic techniques and a feature set which depends the customer and the technical parameters of the customer's terminal involves problems that are not adequately addressed in the prior art.

BRIEF DESCRIPTION OF THE INVENTION

An object of the invention is to develop techniques for providing customized applications that are to be downloaded to user terminal in a cost-effective manner which does not compromise data security. The customized applications reflect user-specific parameters as well as terminal-specific properties. The object of the invention is attained by methods, apparatuses and software products as defined in the attached independent claims. The dependent claims and the following detailed description, along with the attached drawings, describe specific embodiments which solve residual problems and/or provide additional features.

An aspect of the invention is a method for providing a user terminal with a customized application, wherein the application is customized in respect of user-specific parameters and terminal-specific properties, the method comprising performing the following acts by an application server:

storing a template for the customized application and a feature set for each of several terminal types;

receiving a request for creation of the customized application, and based on the request the application server determines the user-specific parameters;

sending the user terminal a first data message which triggers a request from the user terminal;

determining a type of the user terminal based on the request from the user terminal;

determining the terminal-specific properties based on the determined type of the user terminal;

creating the customized application based on the template, the user-specific parameters and the terminal-specific properties; and inserting the customized application into a set of delivery files for a data communication system and transmitting the set of delivery files to the user terminal.

An embodiment of the invention comprises performing header manipulation on the set of delivery files. The header manipulation operation simplifies delivery of the customized application because the terminal user need not initialize any application-downloading operations. Rather the application server is able to provide the customized application as a response to the request from the user terminal.

The determination of the terminal-specific properties based on the determined type of the user terminal may comprise an inquiry to an equipment database, which receives an identifier of a terminal type as an input and provides the properties of that terminal type as a response.

In one embodiment, the creation of the customized application based on the terminal-specific properties may comprise formatting image information based on the user terminal's screen properties. For example, a two-dimensional barcode may be optimally centered and scaled for the display properties of the terminal type, and an appropriately-dimensioned white margin may be provided around the 2D barcode in order to facilitate scanning of the barcode.

In another embodiment the template for the customized application comprises information common to several human languages, and the creation of the customized application may also comprise determination of the human language selected for the terminal user. Based on the determined human language, the application server may retrieve human-language-dependent text elements from a language database.

In yet another embodiment the customized application comprises a concatenation of a network address and identifying information, wherein the network address specifies an address which the user terminal is supposed to contact upon activation of the customized application, and the identifying information identifies the user terminal, its user and/or the customized application. A benefit of this feature is that the terminal user neither has to navigate to the server associated with the application, nor does the user have to identify him/herself with that server. In order to protect user privacy, the customized application may comprise said concatenation in an encrypted form.

Another aspect of the invention is a computer system for providing a user terminal with a customized application. The computer system comprises means for performing the steps of inventive method.

Yet another aspect of the invention is a software product, executable in a computer system, wherein execution of the software product in the computer system causes the computer system to carry out the inventive method.

BRIEF DESCRIPTION OF THE DRAWINGS

In the following the invention will be described in greater detail by means of specific embodiments with reference to the attached drawings, in which:

FIG. 5 shows a definition file for a customized electronic loyalty card.

DETAILED DESCRIPTION OF SPECIFIC EMBODIMENTS

Figure 1:
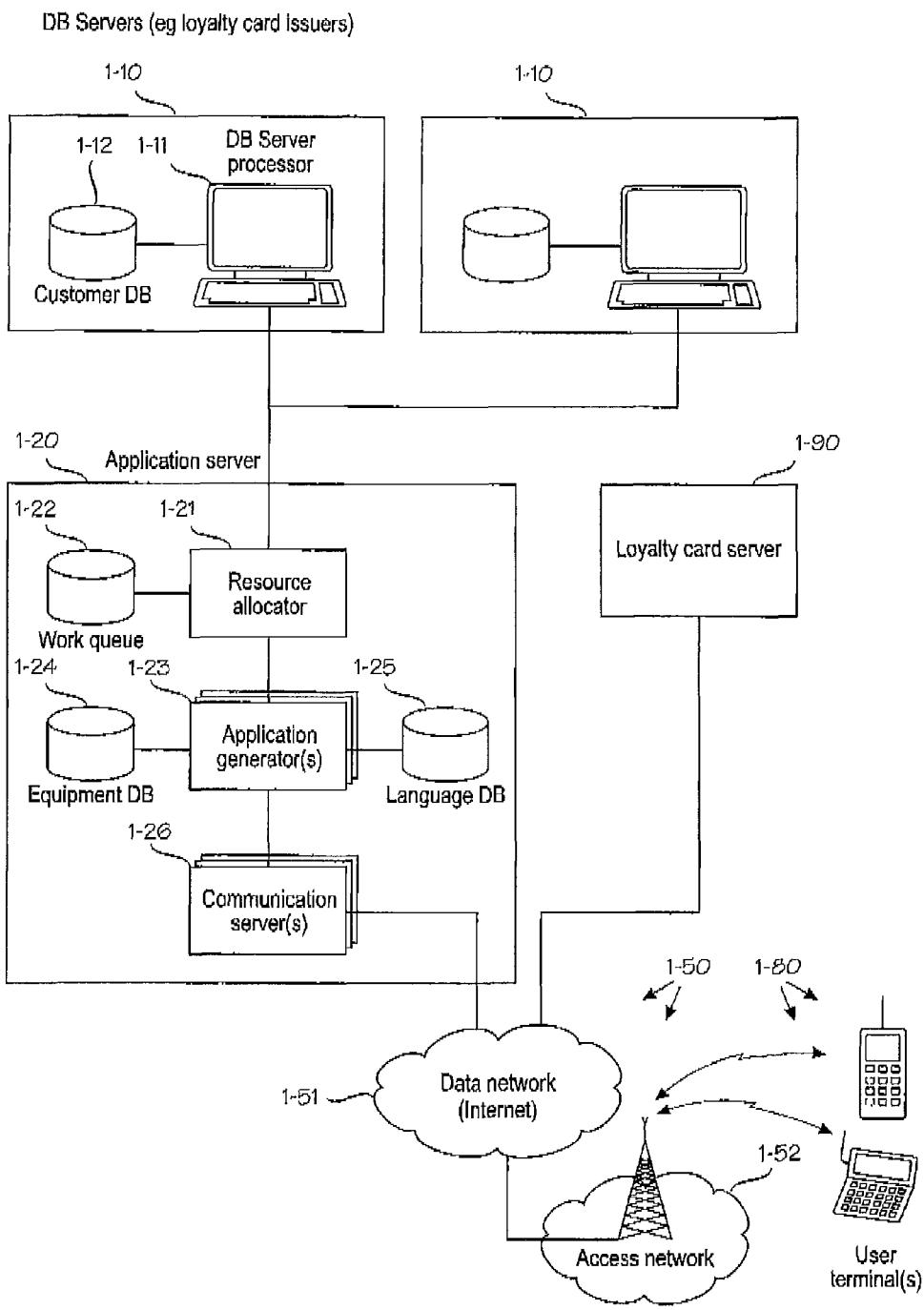
FIG. 1 shows an exemplary system architecture in which the invention can be used.

FIG. 1 shows an exemplary system architecture in which the invention can be used. The four major subsections of FIG. 1 are a set of database servers 1-10, an application server according to an embodiment of the invention, generally denoted by reference numeral 1-20, a telecommunication network (signalling system) 1-50 and a number of user terminals, generally denoted by reference numeral 1-80. As shown in FIG. 1, the user terminals 1-80 differ from one another in respect of various properties, including the resolution of their displays.

In the exemplary implementation shown in FIG. 1, each database server 1-10 comprises a database server processor 1-11 and a database 1-12, such as a customer database that stores data relating to customer-specific loyalty cards. As regards hardware, the database servers may represent conventional technology. For the purposes of the invention it suffices that the database servers 1-10 are capable of requesting the customized application, such as a loyalty card, from the application server 1-20. The customer-specific parameters required for the delivery of the loyalty card can be provided in the request message sent to the application server 1-20. Alternatively, the database server 1-10 should be capable of providing such customer-specific parameters in a response to a separate customer parameter inquiry from the application server 1-20.

As shown in the exemplary implementation shown in FIG. 1, the application server 1-20 comprises a resource allocator 1-21 and a work queue 1-22 for distributing processing resources among several application requests from the one or more database servers 1-10. The processing resources are represented by application generators 1-23, which may be implemented as appropriately programmed data processors. The required programming will be apparent in connection with the following description of the invention and its embodiments. For adapting the requested applications, such as loyalty cards, to the properties of the various user terminals 1-80, the application server 1-20 comprises an equipment database 1-24. Alternatively or additionally, the application server 1-20 may be operatively coupled to an external equipment database (not shown separately). By consulting an optional language database 1-25, the application server may be able to prepare customized applications in several human languages. One or more communication servers 1-26 serve to distribute the generated applications among the user terminals 1-80 via the telecommunication networks 1-50.

In a typical network architecture, the telecommunication networks 1-50 comprise a data network 1-51, which typically is the internet, and an access network 1-52, which typically is a cellular mobile network, a wired or wireless local-area network, or the like. Details of the telecommunication networks 1-51, 1-52, such as intervening network elements, are omitted for the sake of clarity, as such elements represent conventional technology. Alternatively or additionally, a user terminal 1-80 may be coupled to a personal computer (not shown) via a short-range connection, such as an infrared or Bluetooth connection, wherein the personal computer is connected to the application server 1-20 via the Internet 1-51. Finally, reference numeral 1-90 denotes a representative server to be contacted on activation of the customized application in the user terminal. In the exemplary case of the loyalty card, the server 1-90 is the server via which the terminal users may obtain status information concerning their loyalty card accounts.

As regards system architecture, FIG. 1 shows a rather complex, scalable implementation which is capable of supporting a large number of user terminals and issuers of loyalty cards (or other kinds of database servers). For less demanding environments, the invention can be implemented in a less ambitious manner. For example, there may be only one application generator 1-23 and only one communication server 1-25, and in environments which do not require multiple instances of these elements, the resource allocator 1-21 may be omitted as well. In yet another implementation, the application server 1-20 may be installed at the sites of the database servers 1-10.

As regards hardware, the application server may be implemented by means of conventional server technology. The novel elements of the invention may be embodied in appropriate programming of computerized data processing systems and databases. Specifically, the one or more application generators perform the customization and creation of the application, after which the application is conveyed to a communication server for delivery to the user terminal. The servers are data processors with associated memory and peripheral hardware. Thus the invention can be embodied as a software product which is storable in the memory of the application server, such that execution of the inventive software product in the application server causes it to carry out the inventive method.

Figure 2:
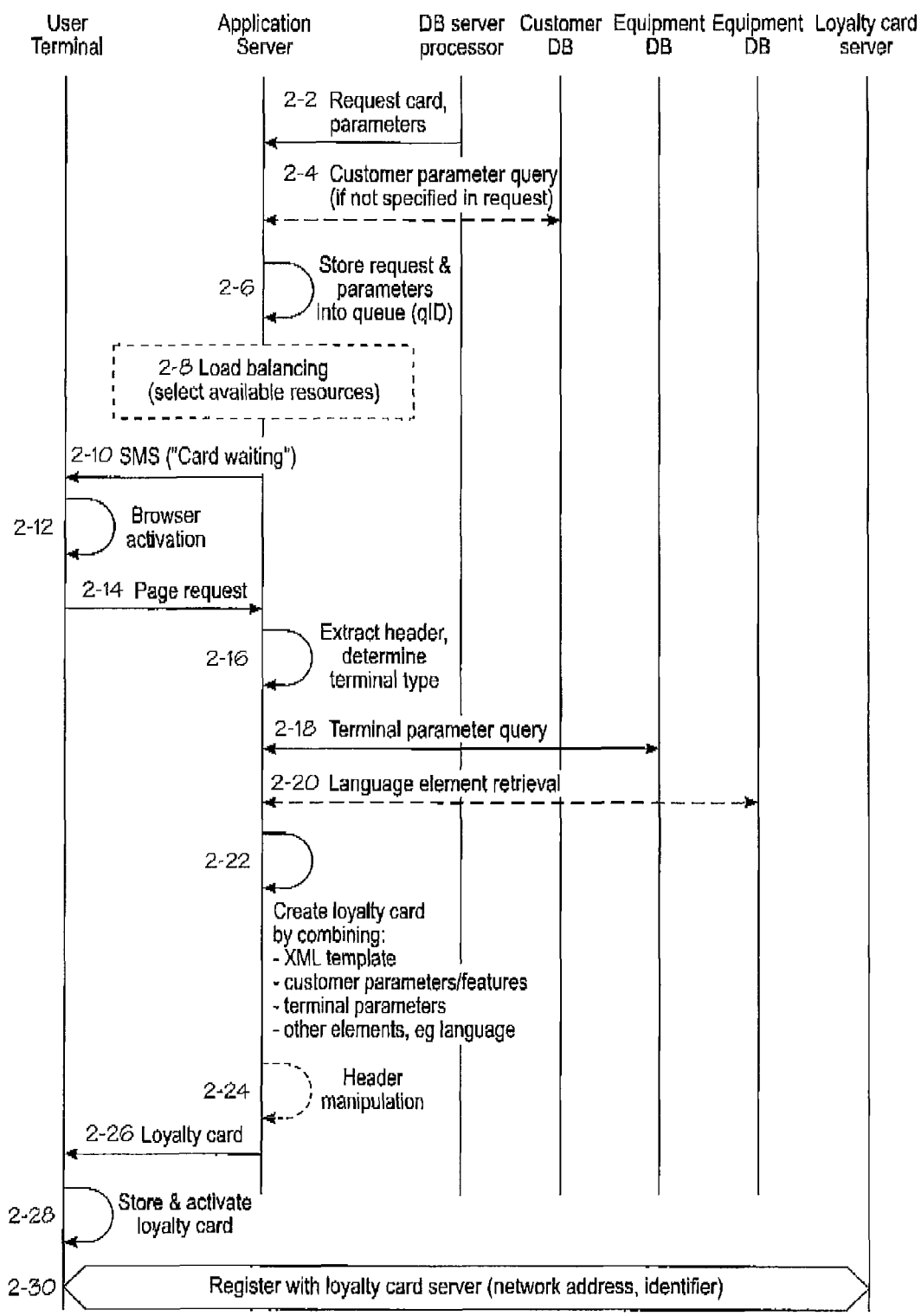
FIG. 2 is a signalling diagram which shows an exemplary use case of the invention in connection with dispatching of electronic loyalty cards.

FIG. 2 is a signalling diagram which shows an exemplary use case of the invention in connection with dispatching of electronic loyalty cards. In FIG. 2, time advances from top to bottom, and dashed lines indicate optional acts, ie, acts which are not strictly essential but solve specific residual problems and/or provide additional benefits. In step 2-2, the database server (item 1-10 in FIG. 1) sends the application server a request for a customized application, such as a loyalty card. The request should include the necessary customer-specific parameters, such as the name and identifier (id) of the customer, the name and id of the issuer of the loyalty card, the loyalty card's name and type, in cases wherein there are several versions, such as a "gold" card, a "silver" card, or the like. Understanding the invention or its embodiments does not necessitate enumeration of all the possible customer-specific and/or issuer-specific parameters. Rather it suffices to say that each loyalty card is individually prepared for a specific customer. It should be noted that each loyalty card will also be individually prepared for the customer's specific terminal, but the database server 1-10 does not keep track of terminal-specific property information. Rather the terminal-specific property information will be determined and used for the customization of the loyalty card later, in connection with steps 2-10 through 2-26.

Normally the database server processor includes all the customer-specific parameters in the request 2-2 for the customized loyalty card. On the other hand, if the card request message 2-2 does not provide all the necessary information for the preparation of the card, the application server may send a separate inquiry 2-4 to the card issuer's customer database. In step 2-6 the application server's resource allocator 1-21 stores the request and the customer-specific parameters into the work queue 1-22 and assigns a queue identifier (qID) to the request. In a multi-processor implementation, the application server may perform an optional step 2-8, which involves load balancing operations, such as selecting and/or waiting for available resources.

At this point the application server has the necessary customer-specific parameters. What it does not have is the customer's terminal-specific property information, such as screen size or resolution and the ability to support various optional features. Interestingly, current Java-enabled mobile terminals do not provide an easy answer to the question of how to request the terminal to indicate its own screen size or resolution to the application server. In a straightforward implementation the customer could log in to some web server and indicate his/her terminal type, whereby such information could be obtained from the customer. In another implementation, a short program routine could be first downloaded, for the purpose of determining and reporting the screen parameters. FIG. 2 shows an embodiment which is capable of determining the terminal type in a more or less automated manner. The automatic determination of the terminal type is initiated in step 2-10, which involves sending a data message, such as a short message, to the user terminal. The short message essentially indicates to the terminal (or its user) that a customized loyalty card is about to be delivered. The short message preferably indicates a network address of the application server and a temporary identifier of the user terminal. For example, the network address may be of the following form: http://application-server.mobi/customer/23456

In the above network address, application-server.mobi is the application server's network address, while customer/23456 is the temporary identifier assigned to the user terminal. In response to the short message, which includes the network address of the application server, the user terminal may propose activation of a web browser to this network address, in which case the terminal waits for the user's acceptance before navigating to the network address. Alternatively, the user terminal may be configured to navigate to the network address without requiring the user's acceptance. As a third alternative, the terminal user may pick up the network address from the short message and navigate to that address himself/herself. In any case the user terminal navigates to the application server's network address in step 2-14. Inclusion of the user's or user terminal's temporary identifier in the messages 2-10 and 2-14 helps the application server to identify the user terminal, and the user does not have to perform a separate login procedure.

As is well known, navigation to a network address by a web browser normally involves requesting a web page (hypertext markup language, HTML, page) from the network address. Now, if the application server responded to the user terminal's web page request by directly downloading the customized application (loyalty card), two problems could be seen. A first problem is that the customized application does not reflect the user-terminal's terminal-specific properties. The other problem is that the user terminal's browser would be confused by receiving a program in response to the request for a web page.

The first problem, which relates to the customization of the loyalty card by the terminal-specific properties is solved in the following manner. In step 2-16 the application server extracts the data packet's header from the request for the web page that the user terminal sent in step 2-14. From the packet header the application server determines the type, ie, manufacturer and model, of the user terminal. In step 2-18 the application server sends a terminal parameter inquiry to the equipment database and obtains the terminal parameters in the response to the inquiry. At this point the application server has all the information it needs to customize the loyalty card in respect of both customer-specific parameters and terminal-specific properties.

Next, in step 2-22, the application server creates the customized loyalty card. In a representative implementation, the application server creates the customized loyalty card by starting with a loyalty card template information. The application server then combine the template information with the customer-specific parameters and/or features and the terminal-specific properties. In a representative but non-restrictive implementation the template information is stored as a file in a self-documenting modelling language, such as XML (extendible modelling language). The template information defines the functionality of the customized application. One of the features defined by the template is an associated network address, such as a URL (uniform resource locator) address, which the user terminal is to contact on activation of the customized application. Under the assumption that the customized application is a loyalty card, the network address is typically that of the loyalty card server (item 1-90 in FIG. 1). The network address may be of the following form:

http://loyalty-card-server.mobi

As briefly stated in connection with FIG. 1, the application server 1-20 may comprise an optional language database 1-25, by means of which the application server is able to prepare customized applications in multiple human languages. If multiple human languages are to be supported, the request message 2-2 from the database server should include an identifier of the human language selected for the loyalty card (or other type of application). In one implementation, the language database comprises a separate version of the template file for each supported human language. A drawback of this implementation is that the functionality of the customized application, which is stored in the template file(s), must be separately maintained for each template file version. An improved implementation of the multi-language support involves a common template for all supported languages. The common template file may comprise a placeholder, such as a text identifier, for each language-dependent text element. Based on the text identifier and the language identifier, the application generator 1-23 queries the language database 1-25 for the each language-dependent text element. While this step is not shown separately, it is analogous with the query 2-18 to the equipment database.

A combination of the loyalty card template information with the customer-specific parameters and terminal-specific properties results in a loyalty card which is individually customized for the customer and their terminal. The remaining, optional, operations in the card-preparation phase relate to formatting of image information, data security and/or prevention of fraudulent behaviour.

One of such optional operations involves concatenating the network address associated with the customized application with an identifier of the loyalty card, the user terminal or its user. Such a concatenation of a network address and the identifier of the loyalty card may take the following form: http://loyalty-card-server.mobi/acme_card456789

Herein, acme_card456789 is the identifier of the individual user's loyalty card. In the loyalty card example, the concatenation of the user identifier with the URL of the loyalty card server has the benefit that the terminal user may simply select an activity, such as "my account", from the loyalty card application's menu, and the application directs the user terminal's browser to the loyalty card server associated with that URL. The server may then use the user identifier to determine the identity of the incoming user and provide him/her with proper user-specific account data.

If the loyalty card comprises a concatenation of the user identifier with the URL of the server associated with the loyalty card server, it is also beneficial to encrypt the concatenation, so as to hide the identity of the user and to prevent users from querying account data other than their own.

Another optional operation involves incorporating into the customized application some identifying information as a barcode. The identifying information may identify the user, the user terminal and/or the customized application, such as the loyalty card. For example, the loyalty card's identifier could be embedded into the loyalty card in the form of a two-dimensional barcode, which is readable by optical scanners. While it is self-evident that the two-dimensional barcode reflects the identifier of the loyalty card, it may not be equally self-evident that the bard code should also reflect the properties of the user terminal, most notably its screen size and/or resolution. The barcode should ideally be formatted, that is scaled and positioned, such that the actual barcode is surrounded by a white margin with a width of approximately one centimeter, and the actual barcode optimally fills the space remaining inside the white margin. The white margin helps optical scanners to isolate the barcode from its surroundings. In order to dimension the barcode and the white margin optimally, the application server should determine the user terminal's parameters beforehand, as was explained in connection with steps 2-14 through 2-18. Other images may be formatted in an analogous manner.

At this point all the information for the customized loyalty card has been assembled by the application generator. Next the assembled information is packaged into a set of delivery files, the format of which depends on the type of the user terminal. For example, Java-enabled mobile terminals may be supported by means of .jar and .jad files. The .jar file contains all the functionality of the application, that is, the information from the template file, the optional language-dependent text elements, the user-specific features and the terminal-specific properties. The .jad file, on the other hand, contains a Java Application Descriptor which, for instance, may be displayed via the terminal's display to indicate descriptor information associated with the application, such as author, version, application size, or the like.

At this point the customized loyalty card is ready for delivery to the user terminal. A well-known method of delivering a Java application to a mobile terminal is to send the mobile terminal a message that includes one or more links. By clicking the link, the terminal user can initiate downloading of the customized application. Step 2-24 of FIG. 2 relates to a more elegant delivery technique, in which the customized loyalty card is provided to the user terminal as an automated response to the page request 2-14. A residual problem herein is that the user terminal's browser requested an http page, while the application server is about to deliver a program, namely the customized application. Accordingly, in step 2-24, the application server performs a header manipulation operation, as a result of which the application server will be able to send the customized application as a response to the user terminal's page request 2-14. An example of an appropriately manipulated header will be shown in FIG. 3.

In step 2-26 the customized application, such as the loyalty card, is delivered to the user terminal. In step 2-28 it is stored in the user terminal's application memory and registered as an executable application. Steps 2-26 and 2-28 can be performed by conventional technology.

Finally, in step 2-30, the user terminal logs in with the loyalty card server (item 1-90 in FIG. 1). Provided that the loyalty card includes a concatenation of the loyalty card server's network address and the identifier of the loyalty card, the terminal user only needs to select the loyalty card from the terminal's menu, after which the customized loyalty card application contacts the loyalty card server's network address, and the loyalty card server extracts the loyalty card's information from the terminal's initial message. After that, the usage of the loyalty card may continue in a more or less conventional manner.

Figure 3:
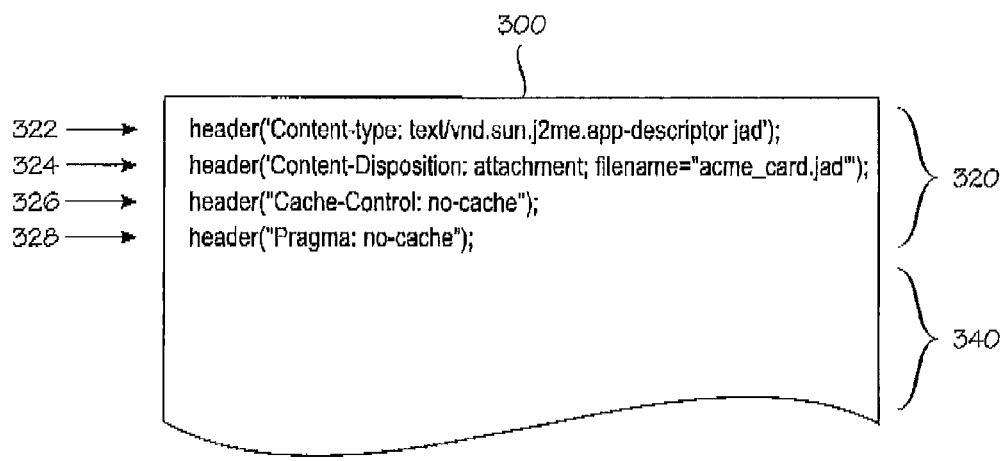
FIG. 3 shows an appropriately manipulated header, by means of which the application server is able to send the customized application as a response to the user terminal's http page request.

FIG. 3 shows an appropriately manipulated header, by means of which the application server is able to send the customized application as a response to the user terminal's http page request. Reference numeral 300 generally denotes a .jad (Java Application Descriptor) file, which comprises a header portion 320 and a body portion 340. The latter is entirely conventional and has been hidden for the sake of clarity. In the present example, the header portion 320 comprises four lines, of which the two first lines 322 and 324 relate to the header manipulation shown as step 2-24 in FIG. 2. Line 322 indicates a content type for the application descriptor, while line 324 indicates the content disposition for the actual loyalty card, which is sent as an attachment file. Optional lines 326 and 328, which relate to data security, indicate that the transmission should not be cached.

Figure 4:
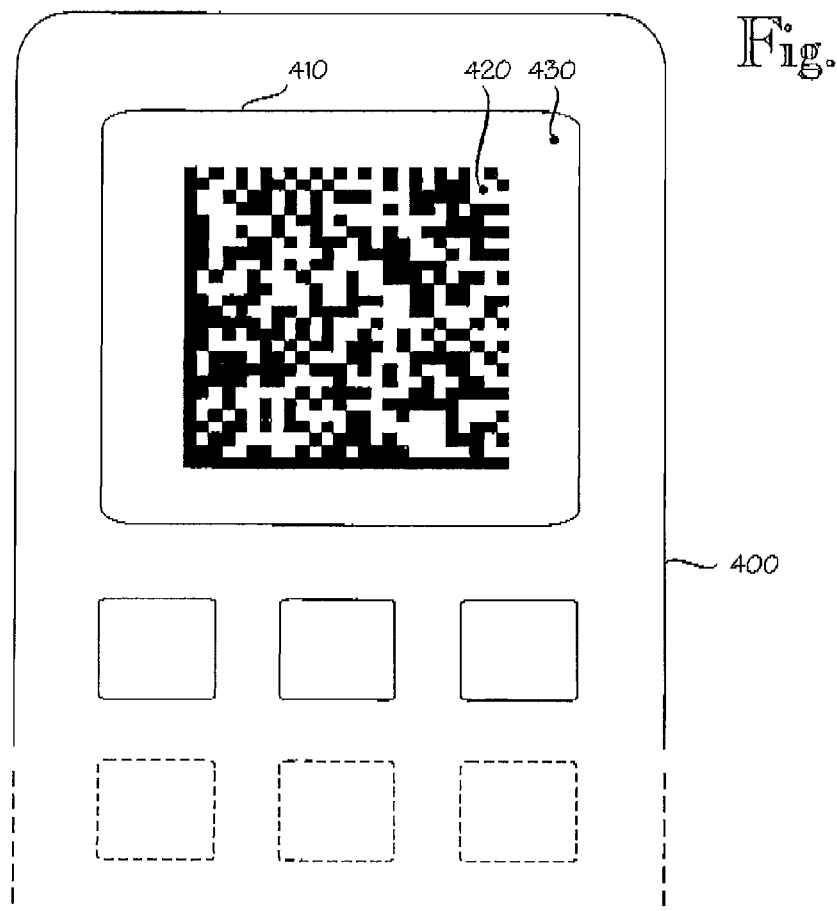
FIG. 4 shows a two-dimensional barcode optimally formatted for the display screen of a specific user terminal.

FIG. 4 shows a two-dimensional barcode 420 optimally formatted for the display screen 410 of a specific user terminal 400. The barcode 420 is centered within the display screen 410 and a white margin 430 of at least a few millimeters surrounds the barcode 420, so as to facilitate optical scanning of the barcode. Optimal formatting of the barcode may require information on the display screen in terms of both dimensions and resolution. Assume, for example, that the display screen 410 measures 40 mm and 240 pixels in either direction, which translates to 6 pixels/mm. A white margin of, say, 5 mm on either side of the bar code means 10 mm or 60 pixels in total. Thus the actual barcode 420 should span an area of 240−60=180 pixels across. The 2D barcode 430 shown in this example has 26 bits of information in either direction, which means that each bit of the 2D barcode should be drawn with a grid of 6*6 or 7*7 display pixels (180/26=6.92).

FIG. 5 shows a definition file 500 for a customized electronic loyalty card. The description language being used is a derivative of XML, and those skilled in the art are likely to find that the definition file 500 is largely self-documenting. For instance, line 501 begins the definition of the card, while line 539 ends it. Line 502 defines a file to be displayed as background graphics, while line 503 defines an image to be displayed superimposed on the background graphics, and so on. Lines 503 and 504 define identifiers for the terminal user and the loyalty card, respectively.

Line 510 begins a definition of a menu, while line 519 ends the menu definition. The selectable items of the menu are defined by the lines between the lines 510 and 519. For example, line 511 provides a definition for a menu item whose activation will provide web access to the terminal user. Line 512 defines a menu item for a positioning application. Line 517 defines a menu item for a "send to a friend" function that may or may not be implemented, depending on the specific user. Line 518 defines a barcode, as was described in connection with FIG. 4. Lines 520 through 531 define various properties and capabilities of the terminal type. For instance, lines 522 and 523 indicate that the terminal for which the card definition file 500 is customized, supports Java script and a location application, respectively. Lines 530 and 531 indicate that the terminal supports Bluetooth and network-originated IMEI locking, respectively.

As shown in FIG. 5, the definition file 500 for the customized electronic loyalty card includes user-specific features, such as the user name on line 504, card-specific features, such as the card's identification on line 505 as well as terminal-specific features, such as the property and capability definitions between lines 520 and 531. The electronic loyalty card can be customized and installed on the user terminal with almost complete automation, in response to request from the database server to the application server (see step 2-2 in FIG. 2).

It is readily apparent to a person skilled in the art that, as the technology advances, the inventive concept can be implemented in various ways. The invention and its embodiments are not limited to the examples described above but may vary within the scope of the claims.

The invention claimed is:

1. A method performed by an application server, the application server comprising an equipment database for storing terminal-specific properties of a plurality of different user terminals, the application server being configured to:
store a template for a customized identification document application and a feature set for each of several terminal types;
receive a request for creation of the customized identification document application for a user, and based on the request for the creation of the customized identification document application, the application server determining user-specific parameters of the user;
send a user terminal corresponding to the user a first data message, the first data message triggering a response from the user terminal, the response from the user terminal enabling the application server to determine a type of the user terminal, wherein the first data message comprises an identifier that identifies the user and the identification document application to be customized to the application server;
receive the response from the user terminal, the response comprising the identifier that identifies the user and the identification document application to be customized to the application server;
determine the type of the user terminal based on a data packet header of the response from the user terminal, without a separate login feature;
determine the terminal-specific properties based on the determined type of the user terminal;
create the customized identification document application based on the template, the user-specific parameters and the terminal-specific properties; and
insert the customized identification document application into a set of delivery files for a data communication system and transmitting the set of delivery files to the user terminal.

2. The method according to claim 1, further comprising:
performing header manipulation on the set of delivery files, so as to be able to provide the customized identification document application as a response to the request from the user terminal.

3. The method of claim 2, where the header manipulation on the set of delivery files enables the application server to send the customized identification document application to the user terminal as a program responsive to the response from the user terminal, the response from the user terminal comprising a web page request.

4. The method according to claim 1, wherein the determination of the terminal-specific properties based on the determined type of the user terminal comprises an inquiry to an equipment database.

5. The method according to claim 1, wherein the creation of the customized identification application based on the terminal-specific properties comprises formatting image information based on screen properties of the user terminal.

6. The method according to claim 1, wherein the template for the customized identification document application comprises information common to several human languages, and the creation of the customized identification document application also comprises determination of a specific human language and retrieval of human-language-dependent text elements from a language database.

7. The method according to claim 1, wherein the customized identification document application comprises a concatenation of a network address and identifying information, wherein the network address specifies an address for contacting by the user terminal and the identifying information identifies at least one of the user terminal, its user and the customized application.

8. The method according to claim 7, wherein the customized identification document application comprises said concatenation in an encrypted form.

9. The method according to claim 1, wherein the first data message comprises a header that comprises identifying information that identifies said user terminal.

10. The method according to claim 1, wherein the determination of the terminal-specific properties comprising determination of at least a dimension and a resolution of the user terminal.

11. The method of claim 1, wherein the first data message comprises a network address of the application server and the identifier.

12. The method of claim 11, comprising the application server:
extracting a header of a data packet included in the response;
determining the type of the user terminal from the header;
sending the equipment database a terminal parameter inquiry for the terminal-specific properties corresponding to the determined type of user terminal; and
obtaining the terminal-specific properties in response to the terminal parameter inquiry to the equipment database.

13. The method of claim 1, wherein the first data message comprises a network address of the application server and the response from the user terminal comprises a web page request corresponding to the network address of the application server, and wherein the application server is configured to receive the web page, extract a header from a data packet of the request for the web page, determine the type of the user terminal from the header, send a terminal parameter inquiry to the equipment database for the terminal-specific properties corresponding to the determined type of user terminal, and obtain the terminal-specific properties in response to the terminal parameter inquiry to the equipment database.

14. The method of claim 13, comprising the application server sending the customized identification document application as a program to the user terminal responsive to the web page request from the user terminal.

15. A computer system, comprising:
an equipment database for storing terminal-specific properties of a plurality of different user terminals;
an application server, the application server including a processor, the processor being configured to execute instructions to cause the computer system to:
store a template for defining functionality of a customized identification document application and a feature set for each of several terminal types;
receive a request for creation of the customized identification document application, the application server determining user-specific parameters based on the request;
send a user terminal corresponding to the user specific parameters a first data message, the first data message triggering a response from the user terminal, the response from the user terminal enabling the application server to determine a type of the user terminal, wherein the first data message comprises an identifier that identifies the user and the identification document application to be customized to the application server;
receive the response from the user terminal, the response comprising the identifier that identifies the user and the identification document application to be customized to the application server;
determine the type of the user terminal without a separate login procedure based on a data packet header of the response from the user terminal;
determine the terminal-specific properties based on the determined type of the user terminal;
create the customized identification document application based on the template, the user-specific parameters and the terminal-specific properties; and
insert the customized identification document application into a set of delivery files for a data communication system; and
transmit the set of delivery files to the user terminal.

16. The computer system according to claim 15, wherein the first data message comprises a header that comprises identifying information that identifies said user terminal.

17. The computer system according to claim 15, wherein the application server is configured to determine at least a dimension and a resolution of the user terminal based on the response.

18. The computer system of claim 15, wherein the first data message comprises a network address of the application server and the response from the user terminal comprises a web page request corresponding to the network address of the application server, and wherein the application server is configured to receive the web page, extract a header from a data packet of the request for the web page, determine the type of the user terminal from the header, send a terminal parameter inquiry to the equipment database for the terminal-specific properties corresponding to the determined type of user terminal, and obtain the terminal-specific properties in response to the terminal parameter inquiry to the equipment database.

19. A software product, embodied on a non-transitory computer readable medium and executable in an application server, the application server comprising an equipment database for storing terminal-specific properties of different user terminals, and wherein execution of the software product in the application server causes the application server to carry out the following acts:
storing a template for defining functionality of the customized identification document application and a feature set for each of several terminal types;
receiving a request for creation of a customized identification document application, the request configured to permit the application server to determine user-specific parameters of a user;
sending a terminal corresponding to the user-specific parameters a first data message, the first data message configured to trigger a response from the user terminal that enables the application server to determine a type of the user terminal, wherein the first data message comprises an identifier that identifies the user and the identification application to be customized to the application server;
receiving the response from the user terminal, the response comprising the identifier that identifies the user and the identification document application to be customized to the application server;
determining the type of the user terminal without a separate login feature based on the response from the user terminal;
determining the terminal-specific properties based on the determined type of the user terminal;
creating the customized identification document application based on the template, the user-specific parameters and the terminal-specific properties; and
inserting the customized identification document application into a set of delivery files for a data communication system and transmitting the set of delivery files to the user terminal.

20. The software product according to claim 19, wherein the first data message comprises a header that comprises identifying information that identifies the user terminal.

21. The software product according to claim 19, wherein the determination of the terminal-specific properties comprising determination of at least a dimension and a resolution of the user terminal.

* * * * *